United States Patent [19]

Greenwald et al.

[11] 3,831,148

[45] Aug. 20, 1974

[54] NONEXECUTE TEST APPARATUS

[75] Inventors: Donald J. Greenwald, Nashua, N.H.; Thomas O. Holtey, Newton, Mass.

[73] Assignee: Honeywell Information Systems Inc., Waltham, Mass.

[22] Filed: Jan. 2, 1973

[21] Appl. No.: 320,048

[52] U.S. Cl. ........................ 340/172.5, 235/153 AC

[51] Int. Cl. ........................ G06f 11/04

[58] Field of Search ....... 340/172.5, 146.1; 235/153

[56] References Cited

UNITED STATES PATENTS

| | | | |
|---|---|---|---|
| 3,213,427 | 10/1965 | Schmitt et al. | 340/172.5 |
| 3,343,141 | 9/1967 | Hackl | 340/172.5 |
| 3,518,413 | 6/1970 | Holtey | 235/153 |
| 3,576,541 | 4/1971 | Kwan et al. | 340/172.5 |
| 3,646,519 | 2/1972 | Wollum et al. | 340/172.5 |
| 3,659,272 | 4/1972 | Price et al. | 340/172.5 |
| 3,688,263 | 8/1972 | Balogh et al. | 340/172.5 |

*Primary Examiner*—Paul J. Henon
*Assistant Examiner*—Mark Edward Nusbaum
*Attorney, Agent, or Firm*—Faith F. Driscoll; Ronald T. Reiling

[57] ABSTRACT

Diagnostic apparatus tests the operation of a control store included within data processing apparatus to verify the contents of each storage location and the operation of logic circuits associated therewith. The diagnostic apparatus is utilized when a resident maintenance routine stored within the control store is referenced which causes the read out of a microinstruction included within a predetermined control store location. Logic circuits included within the diagnostic apparatus decode the microinstruction and generate a subcommand which transfers control to the diagnostic apparatus. The diagnostic apparatus inhibits all operations except the addressing and the reading of the control store locations. The contents of the control store locations are checked in sequence by checking circuits until either the logic circuits decode a second microinstruction or until an error is detected. When the checking circuits detect an error, they cause the diagnostic apparatus to halt the test. At this time, the contents of the control store address register are displayed indicating where the failure occurred. When no failures are displayed, testing continues until a second microinstruction is decoded by the apparatus which completes the testing by causing the transfer of control back to the control store enabling execution of subsequently read microinstructions.

20 Claims, 19 Drawing Figures

NONEXECUTE TEST APPARATUS

RELATED APPLICATIONS

Branch Facility Diagnostics invented by Thomas O. Holtey and Donald J. Greenwald, filed on Aug. 26, 1971, Ser. No. 175,266, assigned to the assignee of the present invention which issued on Apr. 17, 1973 as U.S. Pat. No. 3,728,690.

FIELD OF THE INVENTION

The present invention relates generally to data processing apparatus and more particularly to diagnostic apparatus for testing the operation of a control store which stores addresses and instructions and is included within the data processing apparatus.

DESCRIPTION OF THE PRIOR ART

As well known, both read only control stores and writable control stores have been used to store microprogramming information. In order to provide for reliable operation of the data processing system, various techniques have been developed for diagnosing faults within the control store and the apparatus associated with the control store. Most of these techniques involve independent testing of the control store in contrast to self diagnosis. Those techniques which have performed self diagnosis utilize diagnostic programs, termed microdiagnostics, which are incorporated as part of a total maintenance facility for performing basic test operations upon the various portions of the data processing system including the microprogrammed control store. The testing of the control store has included a program arranged to scan every word in the control store and check for correct parity in each word. An article titled "The Microdiagnostics for the IBM System 360 Model 30" by A. M. Johnson, *IEEE Transactions on Computers*, July 1971, describes such a program.

Up to now, the type of testing mentioned above has been manually initiated, as for example, by maintenance personnel as a consequence of a system fault. That is, when a fault occurs preventing further processing, the maintenance personnel first must place the system in a special mode so it cannot run programs and then initiate control store testing from a maintenance diagnostic control panel. To provide for safety and efficiency, normally, the testing must be done by highly experienced and highly trained service personnel. This ensures that no test of the control store is made inadvertently when the system is processing normally thereby preventing the destruction of valuable data program information. More importantly, when the microcommands derived from the control store are used to initiate certain input/output operations directly, it is necessary to guard against such inadvertent testing since it can result in the execution of input/output operations unknown to the user causing destruction of information and possible damage to data records stored by the input/output equipment.

In addition, to having to provide experienced personnel, a further disadvantage of the arrangements of the prior art is that even experienced personnel may be unable to determine the proper time to initiate certain diagnostic operations during normal processing operations.

Another problem encountered in testing the control store is determining whether an error has resulted from incorrectly stored information or because a storage location outside the limits of control store has been addressed, a nonexistent area of memory (a location which stores all zeros). This problem is compounded where the verification operation allows the simultaneous checking of several functions performed by the control store, such as the checking of the information read and whether it has been read from the appropriate storage location. Thus, a parity check performed on either a nonexistent memory location or unused storage locations can be flagged as an information error and stop the test.

Accordingly, it is an object of the present invention to provide a checking apparatus for verifying the operation of a microprogrammed control store.

It is a further object of the present invention to provide checking apparatus for testing the control store of a processing system which can be conditioned to perform self-testing under microinstruction control in response to certain external signals.

It is a still further object of the present invention to provide checking apparatus for testing a microprogrammed control store wherein the testing is initiated and terminated automatically under the control of microinstructions included in the control store.

It is a more specific object of the present invention to provide microdiagnostic apparatus for verifying the microinstruction words of a writable control store and signalling errors relating to the correctness of the information read notwithstanding the noncontiguous character of addressing the memory storage locations.

SUMMARY OF THE INVENTION

These objects are accomplished in a preferred embodiment of the invention which includes diagnostic logic circuits responsive to hardware generated signals to cause a control store to reference a predetermined storage location which stores a first microinstruction included within the normal instruction set coded to specify a test operation rather than its normal operation. Upon the decoding of the microinstruction, control apparatus associated with the address control circuits of the control store is operative to initiate a scanning operation in which the contents of the control store are checked for correctness. The operation is initiated in a manner so as to inhibit the execution of subsequently read microinstructions thereby enabling the testing of the control store and verification of its contents without alteration of the system status or data.

In the above checking operation, during the execution phase of each subsequently read microinstruction, parity checking circuits associated with the diagnostic logic circuits are operative to perform a check upon the combination of the information pattern of each microinstruction read to the control store output register and the contents of the control store address register. This verifies the correctness of the information and whether the system is being addressed properly.

When an error is detected by the parity checking apparatus, the diagnostic apparatus initiates a halt in the scanning operation. The contents of the control store address register and the output register are then automatically displayed to indicate the source of the failure.

The scanning operation for verifying the contents of the control store continues until a subsequent microinstruction word is encountered which causes a transfer of control back from the diagnostics logic circuits to the control store. This ensures successful completion of the test operation and enables the execution of subsequently read microinstructions of test routines and maintenance routines for verifying the operation of other portions of the system.

The output terminals of the circuits included within the control store output register are arranged to provide signals corresponding to the coding of the microinstruction which first caused the initiation of the test when an all zero output is read out from an addressed storage location. When this pattern is encountered, the diagnostic circuits inhibit the parity checking circuits from halting the test. In this manner, the invention provides for the sequencing through noncontiguous areas of the control store.

At the completion of the test, the diagnostic apparatus is operative to check the state of a storage device to determine whether test was initiated under the correct conditions. If not, the diagnostic apparatus sets an indicator signalling a nonexistent memory location error.

Since the testing operation is made an integral part of a resident microdiagnostic maintenance routine stored within the control store, it can be initiated automatically either on a periodic basis or in response to the occurrence of certain events. The events normally include the sensing of certain error conditions or upon the completion of having written new information into the control store for the purpose of executing additional tests or for emulation of other systems.

In the preferred embodiment, the diagnostic logic circuits form part of the address control apparatus. By making the maintenance routine resident in the control store and by permitting periodic automatic initiation of the test through the address control logic circuits also used to execute branching operations, the invention increases the reliability of the system by reducing its "hardcore" requirements to a minimum. Moreover, the specific microinstructions used in connection with the performance of these tests are branch instructions which are included as a part of the normal microinstruction set. This arrangement minimizes cost in that it eliminates the need to introduce specially coded instructions for performing diagnostics thereby minimizing the number of different instruction types required by the system. Also, the branch instructions are used for performing additional tests upon the address control apparatus thereby maximizing the sharing of common apparatus.

The above and other objects of this invention are achieved in a preferred embodiment described hereinafter. The novel features which are believed to be characteristic of the invention both as to its organization and to its method of operation, together with further objects and advantages thereof will be better understood from the following description considered in connection with the accompanying drawings. It is to be expressly understood, however, that these drawings are for the purpose of illustration and description only and are not intended as a definition of the limits of the present invention.

DETAILED DESCRIPTION OF THE PREFERRED EMBODIMENT

Figure 1:
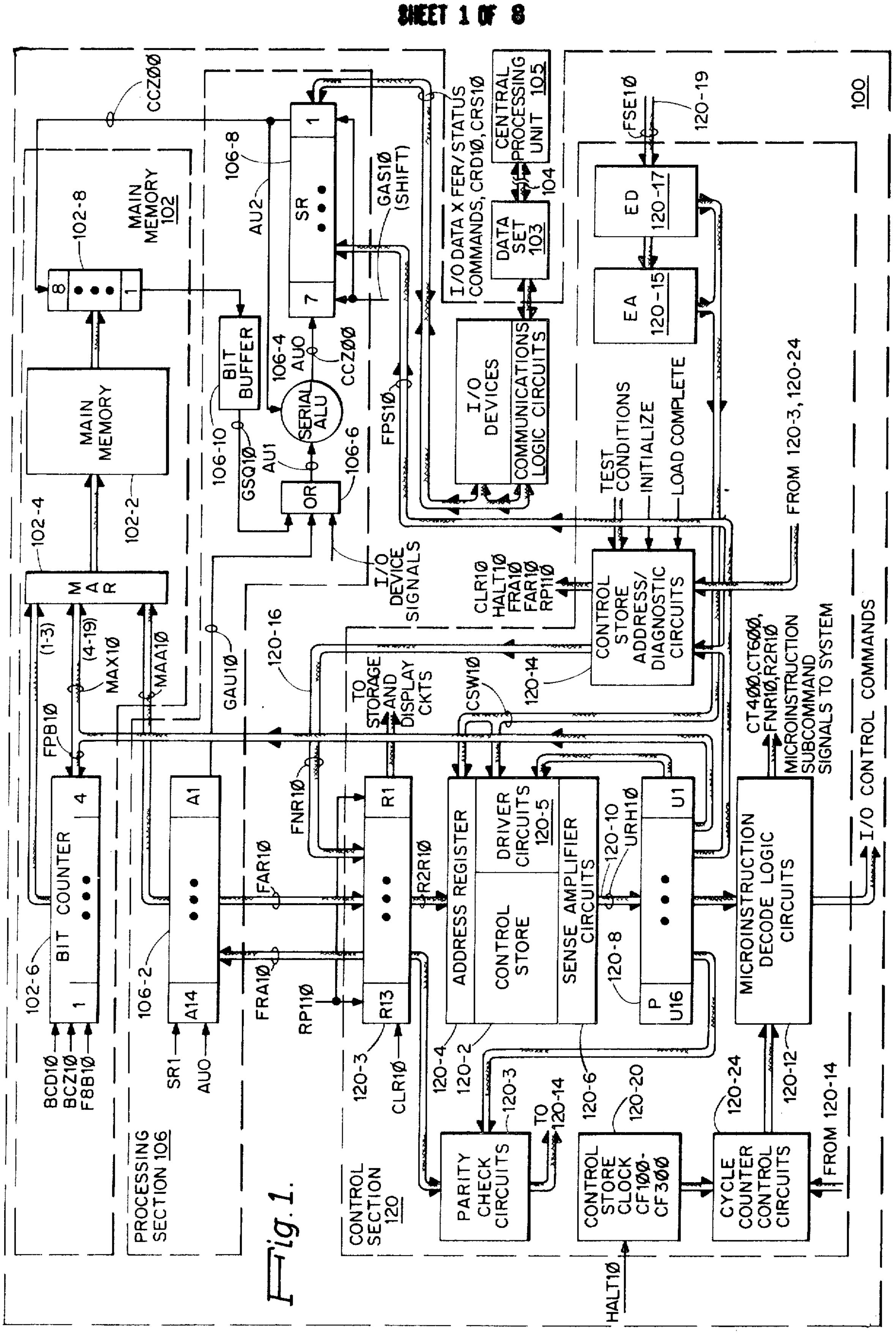
FIG. 1 shows a block diagram of a system incorporating the diagnostic apparatus of the present invention.

FIG. 1 shows in block diagram form a microprogrammed terminal system arranged to perform local data processing and arranged to be operating on-line via a conventional data set or modem 103 and a communications channel 104 to a central processing unit located at a remote central station 105. The terminal system 100 includes a main memory section 102, a control section 120 and a processing section 106.

The main memory section 102 includes a serial access, byte oriented core memory 102-2, conventional in design, which provides storage for user programs and data. Additionally, main memory 102-2 provides working storage for both user programs and system microprograms.

The programs and system microprogram for the purpose of the present invention can be considered conventional in design and can take the form of routines disclosed in U.S. Pat. No. 3,400,371 and those disclosed in a text titled "Microprogramming: Principals and Practices" by Samir S. Husson, published by Prentice-Hall, Inc., copyright 1970.

The main memory section 102 also includes a memory address register 102-4 arranged to receive a portion (i.e., byte address) of a fourteen bit address from either the processing section 106 or the control section 120. The remaining portion (i.e., bit address) of the fourteen bit address is provided by a four stage bit counter 102-6. With the fourteen bit address, the memory address register 102-4 is able to specify any bit of any one of 16K memory bytes of information.

At the start of each read/write cycle of operation, a subcommand signal F8B10 forces the contents of the bit counter 102-6 to a low order bit address (e.g. 111 which corresponds to the address of bit 1). During each subsequent access cycle, the contents of the bit counter are decremented by one through address 000. In this manner, a different bit of each byte location is addressed and read out into an input/output register 102-8. The bit read out into register 102-8 then is either restored to the same location (i.e., during read/restore cycle) or modified and then written back into the same location (i.e., during a clear/write cycle).

As mentioned above, the processing section 106 provides byte address information and this information is obtained from an auxiliary register 106-2, designated as the A register.

The A register servies as a working register and couples to a serial arithmetic-logic unit (ALU) 106-4 via an OR gate 106-4 which provides a path for transfer of its contents to ALU 106-4 for either processing or for storage in main memory. Also, the A register 106-2 is arranged to exchange address information with an address register included within control section 120 in response to a pair of subcommand signals CFRA10 and CFAR10.

Additionally, the processing section 106 includes a seven stage input/output shift register 106-8. The register 106-8 is used for several functions which include serving as a read/write buffer for main memory and input/output transfers, storing, operands and results for the serial ALU 106-4 and source/desgination register for most internal register transfers. The register 106-8 communicates with the buffer registers (not shown) included within each of the input/output devices and a communication logic circuits of the system for transfers in response to microinstruction subcommand signals as, for example, signals CRD10 and CRS10 of FIG. 1. Since the operation of both the main memory section 102 and the processing section 106 are not pertinent to the subject invention, they will not be described in further detail herein.

The control section 120, the most pertinent section to the present invention, provides subcommand signals for controlling the operation of system 100. More specifically, processing performed by section 106, input /output transfer operations between input/output devices and the system, and communication functions are directly controlled by microprograms stored in a control store 120-2 of section 120.

The various routines stored in the control store are shown in FIG. *2a*. These routines include system routines used to check system status before initiating the fetching and the execution of user program software instructions stored in main memory. The routines also include diagnostic and maintenance routines for verifying the operation of the control section and other sections of the system.

An extract routine is used to retrieve the starting address stored in a sequence counter storage location from main memory and then causes fetching of the entire instruction which normally includes an op code, A address, B address and parameters. The various portions of the instruction are stored in predetermined locations of main memory. The control store further includes an op code table which is addressed by the previously stored op code when the entire instruction has been fetched. The table includes a series of 64 branch microinstructions, one for each type of op code which includes the starting address in the control store of the instruction routine used to execute the operation specified. Each of the instruction routines is used to execute a single user instruction using parameters stored in main memory. After completing execution, the instruction routine returns control to the system routines. Also, certain error conditions detected during instruction fetching and execution will cause a return of control to the system routines.

The control store 120-2 is conventional in design and is addressed via a twelve stage address register 120-4 arranged to have its contents incremented via an auxiliary register 120-3 in response to a subcommand signal RP110. The auxiliary register 120-3 provides temporary storage for a current address when the control store is being loaded with new information under microprogram control via a pair of buffer registers 120-15 and 120-17. Register 120-15 provides temporary storage for the address of a storage location to be addressed while register 120-17 provides temporary storage for the information to be written into the addressed storage location. Although not shown, it will be appreciated that these registers can be loaded either externally from an input device via a cable 120-19 or internally from main memory via the input/output register 106-8. A control store clock 120-20, conventional in design, and cycle counter circuits 120-24 generate signals for cycling the control store 120-2 and for establishing the timing for the rest of the system 100 as explained herein.

During a read cycle, the contents of an addressed location are read into an input/output register 120-8 via the sense amplifier circuits 120-6 and a bus 120-10 in response to a subcommand signal RMURH10.

During the read cycle of operation, the contents of the address storage location are checked for correct parity by parity check circuits 120-3. These circuits perform a parity check by comparing bit 16 of the microinstruction word with the parity bit resulting from half adding (i.e., summing without carry) both the microinstruction word and the microinstruction address as explained herein.

After the completion of the read cycle, the microinstruction word stored in register 120-8 is decoded by a group of microinstruction decode logic circuits included within a block 120-12. The circuits of block 120-12 in turn generate subcommand signals which carry out the execution of the microinstruction. During execution, the contents of the register 120-8 are written back into the addressed location via driver circuits 120-5. Following the execution of the microinstruction, the contents of the memory address register 120-4 are incremented by one and are then used to select the address of the next microinstruction to be read.

Normally, microinstructions are read and executed in sequence until either a skip or a branch microinstruction is decoded. When a skip microinstruction is decoded, it causes the contents of the memory address register 120-4 to be incremented twice during the execution cycle. When a branch instruction is executed, it causes control store address/diagnostic circuits included within a block 120-14 to apply the branch address stored in the input/output register 120-8 to the address register 120-4 via a bus 120-16 in response to a subcommand signal FNR10. Other types of branch microinstructions to be described herein cause the generation of the subcommand signal FRA10 which causes the address information in the register 120-8 to be stored in the A register 160-2 of the processing section 160.

FIGS. *2a* through *2k* show various microinstruction word formats. Referring to FIG. *2a*, it is seen that generally each microinstruction word has sixteen bits which are divided into four fields. The first eight bits normally constitute a data field, the next four bits normally are coded to specify the type of arithmetic or logical operation to be performed by the ALU, the next two bits are normally coded to specify the type of microinstruction, the next bit is a special control bit settable and resettable externally and the last bit is a parity bit which provides odd parity for the bits of the microinstruction word exclusive of bit 15 and the corresponding address bits.

FIGS. 2*b* through 2*k* illustrate the coding of the microinstruction words for seven types of microinstructions. The first type of microinstruction, designated type 1, has in its data field, codes of the microoperations for controlling data transfers between the registers of the system, for incrementing/decrementing of the input/output register 106-8 and for directly controlling input/output operations between the peripheral devices and the system such as providing control signals to card reading peripheral devices.

The next two microinstruction types, designated types 2 and 3, are used to perform memory operations, wherein information stored in main memory is accessed or rewritten at a storage location specified by the bits of the data field of the microinstruction.

The fourth type of microinstruction word, designated as type 4, has the two formats shown. This microinstruction is used to cause a parameter byte or word included within the data field of the microinstruction to be loaded into a specific register.

The fifth type of microinstruction, designated as type 5, is the most pertinent with respect to the subject invention. Normally, this type microinstruction is used in performing branching operations.

Specifically, when bits 13 and 14 of this type microinstruction are coded as 0, 1 respectively, the microinstruction causes an unconditional branch of control store sequencing to the storage location specified by the bits of the address field, n. With reference to FIG. 1, the unconditional branch is accomplished by causing the generation of subcommand signals FNR10 and R2R10 which cause a signal representation of the microinstruction address field to be first loaded into the control store auxiliary register 120-3 and then into memory address register 120-4. By modifying the coding of bits 1–12, the uncondition branch microinstruction can be used for specific testing operations. More particularly, when bits 13 and 14 of the microinstruction are coded as 0, 1 respectively and the bits of address field, *n*, of the microinstruction are coded to contain a predetermined address (i.e., octal 0003), it initiates the start of a diagnostic program routine which transfers control from the control store to diagnostic apparatus which verifies the operation and contents of the control store as explained herein.

Figures 2B, 2C, 2D, 2E, 2F, 2G, 2H, 2I, 2J, 2K:
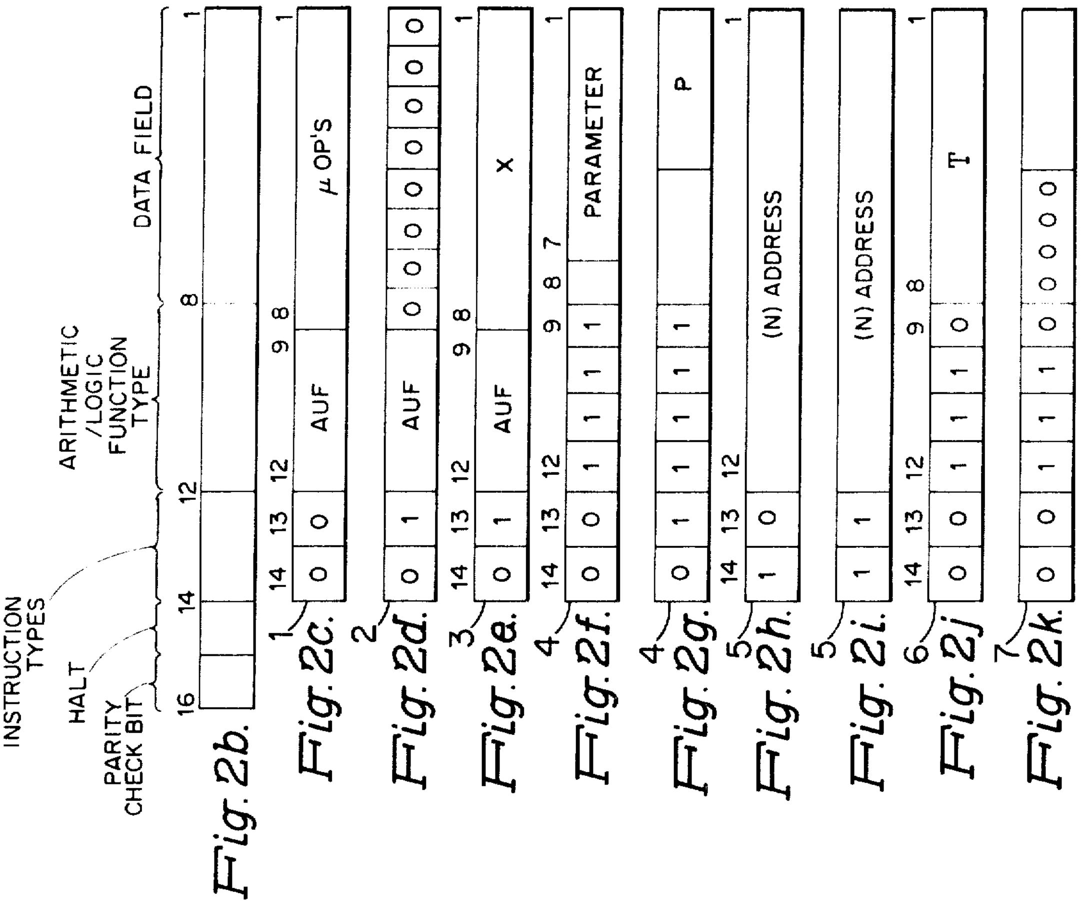
FIG. 2*b* shows the format of the microinstruction words stored in the control memory of FIG. 1.
FIGS. 2*c* through 2*k* show the coding for the different types of microinstruction words stored in the control store of FIG. 1.
Figure 2A:
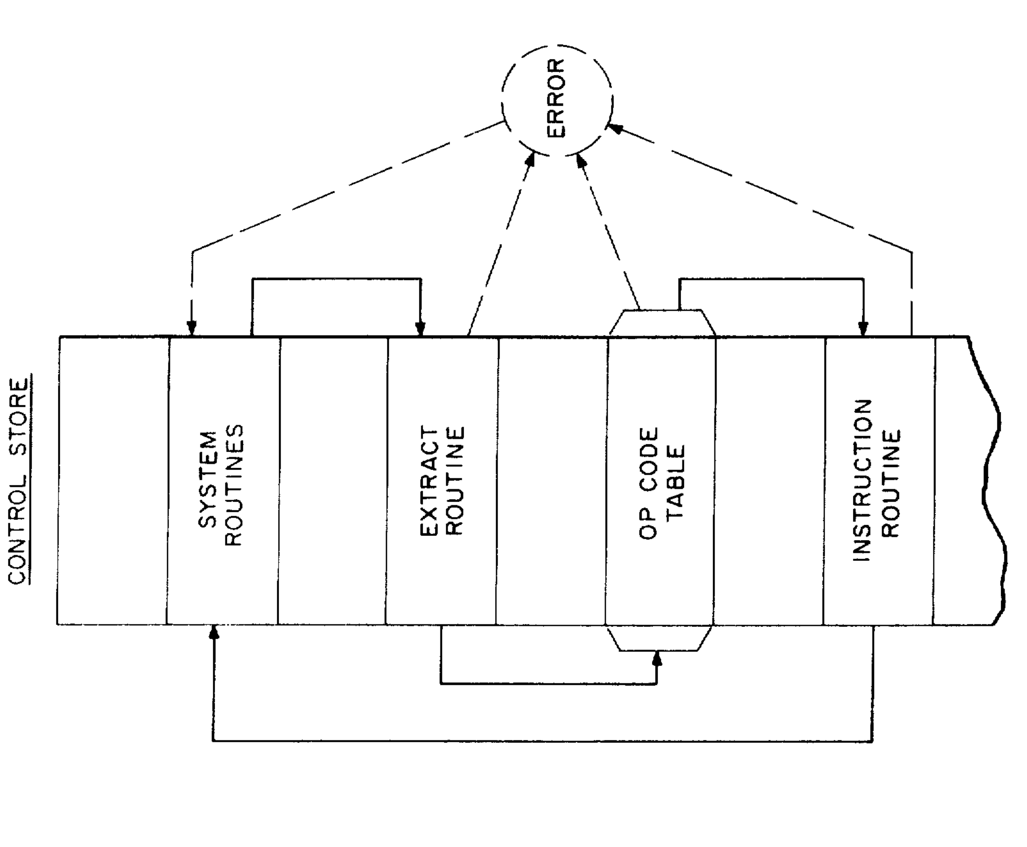
FIG. 2*a* shows the types of microinstruction routines stored in control store of FIG. 1.

As also illustrated by FIG. 2*f*, the coding of bits 13 and 14 as both binary ONES causes a store and branch operation to be performed. In this operation, signals representing the current address contents of the control store address register are first stored in another register and the control store then branches to a storage location whose address is specified by the address field *n* of the microinstruction.

With reference to FIG. 1, the branch and store operation is performed by the generation of subcommand signals FRA10, FNR10, and R2R10. The first signal causes the A register 160-2 to store a signal representation of the current address contents of the control store register 120-4 present in register 120-3 and then causes the former register to be loaded with a signal representation of the n address field of the microinstruction read out to the control store output register 120-8. The loading operation takes place via the control store address/diagnostic circuits of block 120-14 which apply the address signals present at the output register 120-8 via a set of conductors 120-16 to the auxiliary register 120-3. The signals stored in the register 120-3 are then loaded into the control store address register 120-4 in response to the subcommand signal R2R10.

The type 6 and 7 microinstructions are used in combination with testing operations. Some of these operations are described in greater detail in the previously mentioned patent application of Thomas O. Holtey and Donald S. Greenwald.

Cycle Logic Circuits

Figure 1A:
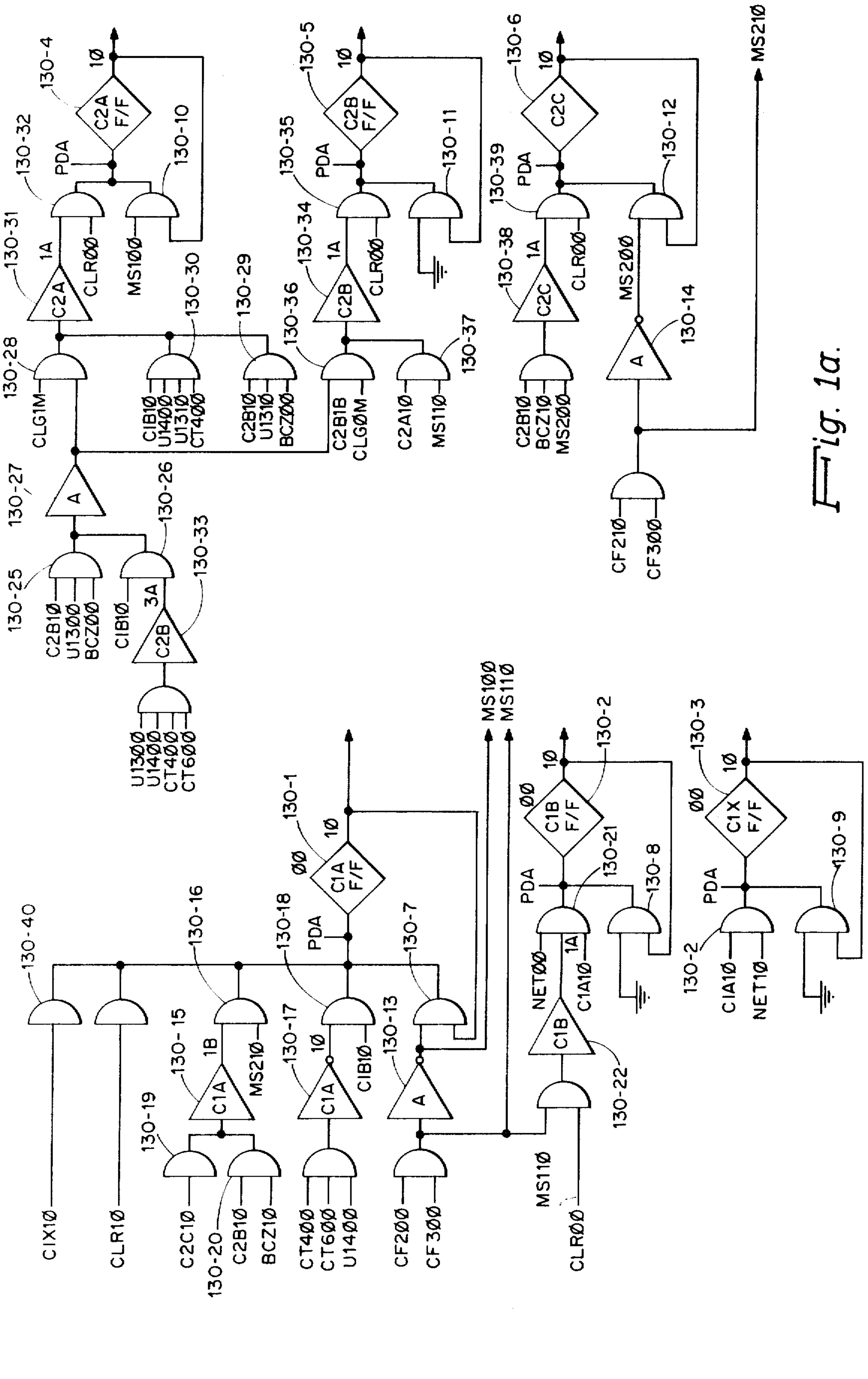
FIG. 1*a* shows in greater detail the cycle logic circuits of FIG. 1.

The logic circuits of block 120-24 of FIG. 1 are illustrated in greater detail in FIG. 1*a*. These circuits determine which operations within a particular time interval are to be performed by the system of FIG. 1. This is accomplished by having certain ones of these circuits establish which set of subcommand signals are to be applied to the various logic circuits and registers within the system of FIG. 1.

Referring now to FIG. 1*a*, it is seen that the cycle logic circuits generally include a plurality of synchronous or clocked flip-flops 130-1 through 130-6, each having individual gating logic circuits arranged as shown. Only one of these flip-flops will be set to a binary ONE at the trailing edge of a PDA clocking pulse for an interval of time in response to several conditions including the decoding of certain types of microinstructions, the generation of certain timing signals or the signals generated other flip-flops included within the cycle logic circuits. The time interval during which each flip-flop remains in its binary ONE state establishes the interval of time for the particular cycle of operation defined by that state. The various cycles of operation and the sequence in which these cycles are entered and exited are best understood with reference to the cycle flow diagram of FIG. 3.

Figure 3:
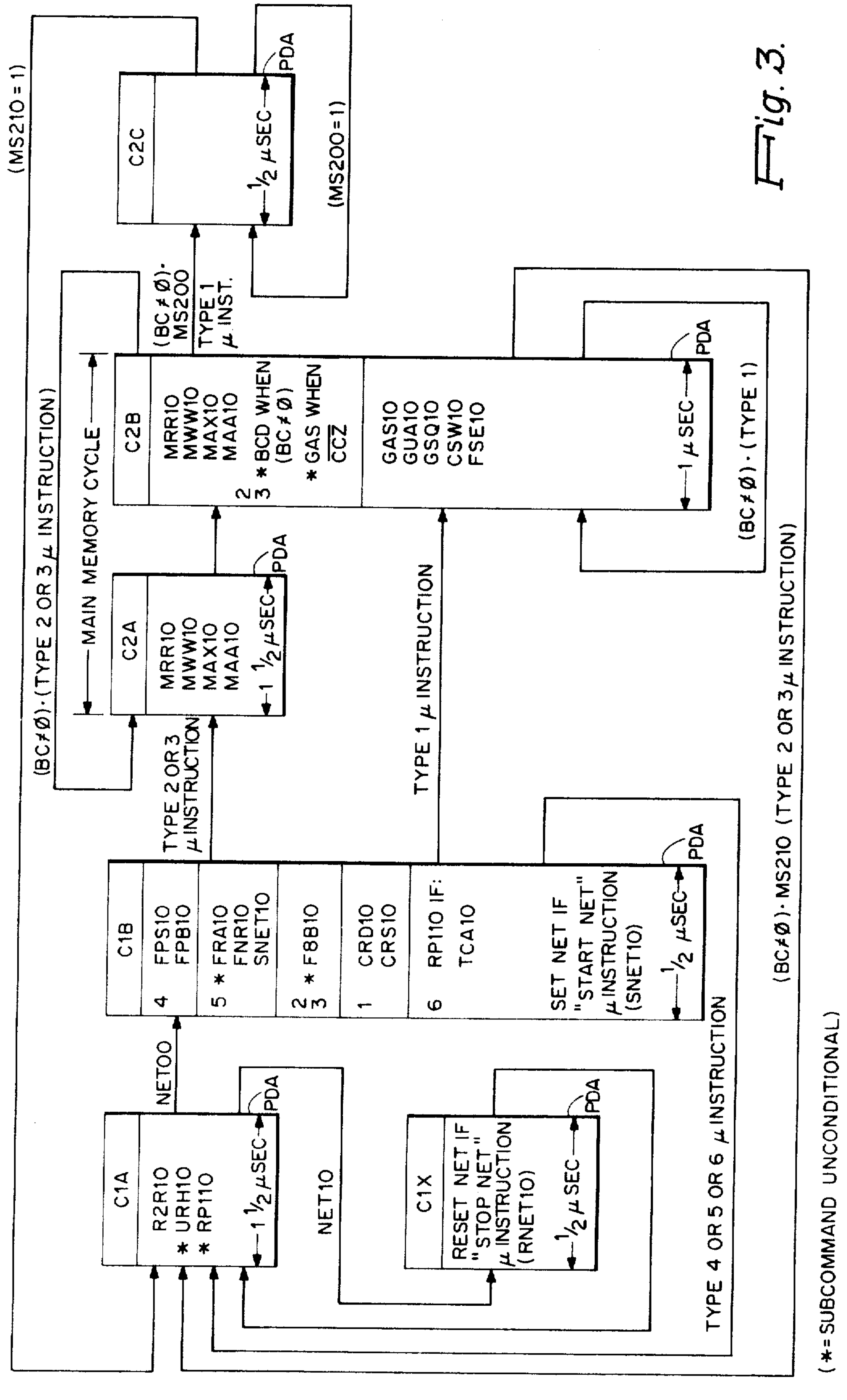
FIG. 3 is a state diagram used in describing the operation of the system of FIG. 1; and, FIGS. 4*a* and 4*b* show a flow diagram used in explaining the operation of the present invention.

Referring to FIG. 3, it is seen that there are six cycles, each represented by one of six blocks and each corresponding to the binary ONE state of a different one of the flip-flop 130-1 through 130-*b*. These cycles are designated C1A through C2C and each cycle has the time duration shown. The more pertinent subcommand signals required to be generated during a particular cycle are included within the block representing the cycle. Also, the conditions for entering and exiting each cycle are also as shown. The first state, C1A, defines a read cycle of operation during which, as mentioned previously, a microinstruction word is read from the control store into the output register 120-8. Once the word has been read into the output register, it is automatically decoded or executed during the next cycle of operation. The state C1B defines this cycle of operation.

As seen from FIG. 3, the execution of a type 2 or 3 microinstruction word is followed by the sequential entering of states C2A and C2B. These states define a main memory cycle of operation during which a bit of information is read from main memory during cycle C2A and manipulated during cycle C2B. The memory cycle is repeated until all of the bits of an entire character have been processed. This event is signalled when the main memory bit counter has been decremented to an all zero count (i.e., BC00 = zero). Similarly, in the case of type 1 microinstructions, the C2B cycles are repeated. During the cycles, the bits of a character are manipulated such as by rotating or shifting. Since these operations do not require accessing main memory, the C2A cycle is omitted.

Following the completion of the execution of a type 1 microinstruction, a C2C cycle is entered. This cycle serves as a synchronization cycle during which no subcommands are executed and provides a time delay necessary for synchronizing the operation of the ALU with the operation of main memory. More particularly, a free-running main memory clock, not shown, generates the basic timing for main memory operations and also provides timing signals MS210 and MS200 at two microsecond intervals. The signals are used to synchronize the operations mentioned by establishing the time which a C1A cycle is entered and a C2B cycle is exited.

Briefly, the switching of the flip-flops of FIG. 1*a* will now be described with reference to FIG. 3. This flip-flop is set to its binary ONE state in response to four conditions. The first condition is that the execution of a type 1 microinstruction has been completed (i.e., C2C10 is a binary ONE) and the main memory clock, not shown, has signalled the occurrence of a 2 microsecond interval (i.e., signal MS210 is a binary ONE). In this instance, flip-flop 130-1 set to its binary ONE state via the circuits including a gate 130-19, an amplifier 130-15 and an AND gate 130-16.

A second condition upon which flip-flop 130-1 is set to its binary ONE state is at the completion of a C2B cycle following the execution of either a type 2 or type 3 microinstruction when an entire character has been processed as signalled by the memory bit counter having been decremented to a count of zero (i.e., BCZ10 is a binary ONE). This switching is accomplished via the circuits including a pair of AND gates 130-20 and 130-16 and amplifier 130-15. The third condition of switching occurs at the completion of a C1B cycle when a type 4, 5 or 6 microinstruction has been executed. In this instance, the circuits including an AND gate and inverter circuit 130-17 and an AND gate 130-18 receive signals (i.e., CT460, CT600 and U1400) defining the microinstruction type mentioned and the signal (i.e., C2B10) defining the correct cycle.

The fourth condition upon which the flip-flop 130-1 is switched to its binary ONE state is upon the completion of a C1X cycle. This switching is accomplished via an AND gate 130-40. When set to its binary ONE state, the flip-flop 130-1 remains in this state for a period of 1.5 microseconds as indicated by FIG. 3. The resetting of this flip-flop is accomplished via an AND gate and inverter circuit 130-13 and an AND gate 130-7. These circuits respond to the occurrence of a timing signal MS110 derived from the main memory clock, not shown.

As explained in greater detail herein, the flip-flop 130-2 and 130-3 are switched to their binary ONE states as a function of a single condition. More particularly, the C1B and C1X cycles are entered alternatively dependent upon whether a specially coded branch type of microinstruction had been read out into the output register 120-8 and executed during a previous cycle of operation. This microinstruction referred to herein as a set nonexecute test microinstruction determines the states of signals NET10 and NET00 applied respectively to flip-flop 130-3 and flip-flop 130-2. When signal NET00 is a binary ONE, the flip-flop 130-2 is switched to a binary ONE via an AND gate and amplifier circuit 130-22 and an AND gate 130-21. The signal MS110, as previously mentioned, is derived from signals generated by the main memory clock, not shown. The signal CLR00 is a binary ONE except when the system has been initialized. Alternatively, when signal NET10 is a binary ONE, flip-flop 130-3 is switched to a binary ONE state via an AND gate 130-23. The flip-flop 130-2 and the flip-flop 130-3 respectively are reset via an AND gate 130-8 and an AND gate 130-9 at the end of .5 microsecond interval.

From FIG. 1a, it is seen that flip-flop 130-4 is set to its binary ONE state in response to two conditions. The first condition which sets this flip-flop is the read out and the execution of either a type 2 or type 3 microinstruction word during cycles C1A and C1B. This switching of flip-flop 130-4 is accomplished via an AND gate 130-30, an amplifier 130-31 and an AND gate 130-32. Additionally, flip-flop 130-4 switches to its binary ONE state via AND gate 130-25, AND gate 130-29, AND gate 130-32 and amplifier 130-31. This group of circuits establishes the condition that a type 2 or type 3 microinstruction word has initiated a main memory operation and that the main memory bit counter has not been decremented to a count of zero (i.e., signal BCZ is a binary ONE). The flip-flop 130-4 is reset via an AND gate 130-10 in response to the timing signal MS100 from the main memory clock, not shown.

As seen from FIG. 3, the flip-flop 130-5, designating a C2B cycle, is set to its ONE state upon the read out and execution of a type 1 microinstruction during cycles C1A and C1B. This is accomplished via the circuits including AND gate 130-26, AND gate 130-35, AND gate 130-36 and the AND gate and amplifier circuit 130-33. Also, when an operation specified by a type 1 microinstruction word is being performed (i.e., signal C2B10 is a binary ONE) and the main memory bit counter has not been decremented to a count of zero (i.e., signal BCZ00 is a binary ONE), the flip-flop 130-5 is switched to a binary ONE. This switching is accomplished via an AND gate 130-25, AND gate 130-36, AND gate 130-35 and amplifier circuit 130-34.

Additionally, the flip-flop 130-5 is set to its binary ONE state upon the completion of a C2A cycle. This switching is accomplished via a pair of AND gates 130-37 and 130-35. The flip-flop 130-5 is reset to a binary ZERO via an AND gate 130-11 when the main memory bit counter has been decremented to a count of zero (i.e., when signal BCZ00 is forced to a binary ZERO).

The flip-flop 130-6, as seen from FIG. 3, designates a C2C cycle and the flip-flop 130-6 is switched to a binary ONE following a C2B cycle as a result of the main memory bit counter has decremented to a count of zero in the presence of timing signal MS200. This switching is accomplished by an AND gate and amplifier circuit 130-38 and an AND gate 130-39. The flip-flop 130-6 is reset to its binary ZERO state when the main memory timing signal MS200 switches to a binary ZERO. This resetting is accomplished via an AND gate 130-12. By way of example, the functions of certain ones of the signals shown in FIG. 1 and sources of these signals are summarized in the glossary herein.

GLOSSARY

| SIGNAL DESIGNATIONS | SOURCE | FUNCTION |
|---|---|---|
| TCA1φ | Control Store 120–2 which executes a type 6 microinstruction. | Tests the state of a carry flip-flop in the ALU. |
| CRD1φ | Control Store 120–2 which executes a type 1 microinstruction. | Loads register 120–8 with data stored in a register of card reading equipment. |
| CRS1φ | Control Store 120–2 which executes a type 1 microinstruction. | Loads register 120–10 with status information stored in a register of card reading equipment. |
| F8B1φ | Control Store 120–2 which executes either a type 2 or 3 microinstruction. | Unconditionally readies the bit counter 120–6 for an eight bit operation by forcing the counter to an all ONES count. |
| FPS1φ | Control Store 120–2 which executes a type 4 microinstruction. | Loads register 106–8 with parameter information contained within register 120–8. |
| FPB1φ | Control Store 120–2 which executes a type 4 microinstruction. | Loads counter 102–6 with parameter information contained within register 120–8. |
| MRR1φ and MWW1φ | Control Store 120–2 which executes a type 2 or 3 microinstruction. | Conditions main memory for performing either a read or write operation. |
| MAX1φ | Control Store 120–2 executes a type 3 microinstruction. | Loads memory address register 102–4 from register 120–8. |
| MAA1φ | Control Store 120–2 executes a type 3 microinstruction coded to have an all zero field. | Loads memory address register 102–4 from register 106–2. |
| GSA1φ | Control Store executes a type 3 microinstruction. | Shifts the contents of the ALU into register 106–8 until bit counter contents are zero (CCZφφ = 0). |
| GSQ1φ | Control Store executes a type 3 microinstruction. | Shifts contents of register 106–8 to bit buffer 106–10. |

Figure 1B:
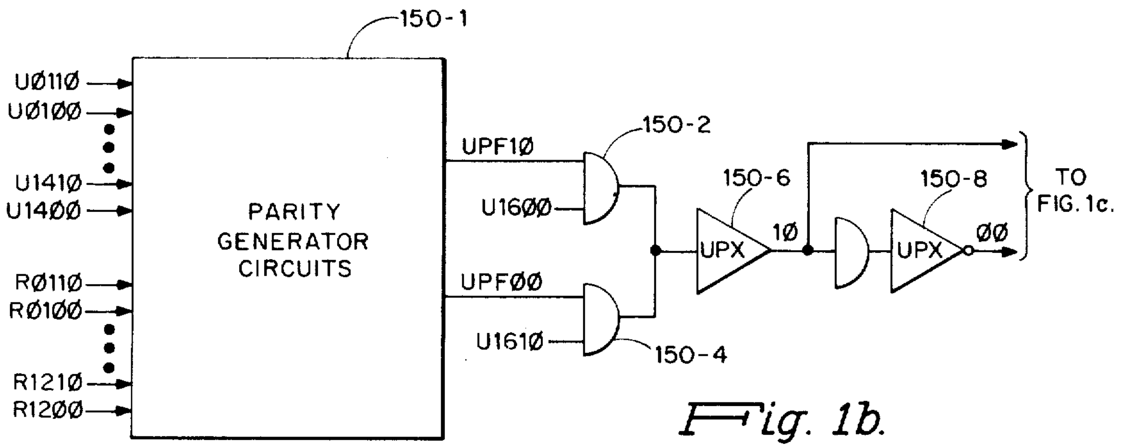
FIG. 1*b* shows in greater detail the checking circuits of FIG. 1.

The FIG. 1*b* shows in greater detail the circuits which perform a check on the accuracy of the information read out to the output register 120-8 as well as a check that the information has been read from the correct address. As seen from FIG. 1b, this is accomplished by parity generator circuits of block 150-1 which sum modulo 2 the first 12 bits of the auxiliary address register 120-3 and the first 14 bits of the output register 120-8. The circuits are conventional in design and may, for example, comprise exclusive OR circuits.

The result of summing both sets of bits is used to generate a single signal and its complement which represents odd parity for both sets of bits. A pair of AND gates 150-2 and 150-4 check the two output signals against the parity bit (i.e., bit 16 of the microinstruction word) in the output register 120-8. The results of the comparison are applied to an amplifier circuit 150-6 and a gate and inverter circuit 150-8. The absence of a comparison between the generated parity bit and its complement forces the parity error signal UPX10 to a binary ZERO and the complement of this signal, UPX00, to a binary ONE. Both signals are forwarded to the circuits of block 120-14.

From FIG. 1, it is seen that the cycle counter control circuits in block 120-24 provide inputs to the control store address/diagnostic circuits of block 120-14. These circuits are shown in greater detail in FIG. 1*c*. Referring to FIG. 1*c*, it is seen that these circuits also receive signals from the output register 120-8. As mentioned, these signals may be applied to the auxiliary control store register via a set of conductors 120-16 in response to the subcommand signal FNR10.

The circuits of FIG. 1*c* also include a plurality of decode circuits for decoding specific bit patterns occurring in the address fields of branch microinstructions and combining them with the fields designating the microinstructions as a branch type of microinstruction. These microinstructions are referred to as start or set nonexecute test (SNET) and stop or reset nonexecute test (RNET) microinstructions. In greater detail, the AND gates circuits 120-40 and 120-41 are arranged to decode an address field bit pattern of the set nonexecute test microinstruction coded as octal 0003. The AND gate and amplifier circuits 120-44 and 120-45 are arranged to decode address field complementary bit pattern of the reset nonexecute test microinstruction coded as octal 7774. An AND gate 120-42 combines the output signal SNET10 produced by AND gate circuits 120-40 and 120-41 with the signals generated from bit positions 13 and 14 of the SNET microinstruction word. Similarly, an AND gate 120-46 combines the output signal RNET10 generated by AND circuits 120-44 and 120-45 with the signals produced by bit positions 13 and 14 of the microinstruction word.

When the first set of AND gates decode the bit pattern 0003 within the address field of the SNET microinstruction word and bits 13 and 14 are coded as 0,1, AND gate 120-42 forces output signal SNET10 to a binary ONE. The signal SNET10 is applied to a synchronous Non-Execute Test (NET) flip-flop 120-50 via an AND gate and amplifier circuit 120-50 and a gate 120-54. The flip-flop 120-50 is set to a binary ONE when signal SNET10 is a binary ONE during an execute cycle of operation (i.e., signal C1B10 is a binary ONE). The Non-Execute Test flip-flop 120-50 is reset to a binary ZERO at the trailing edge of a PDA clock pulse via an AND gate and inverter circuit 120-53 and an AND gate 120-56 when AND gate 120-46 forces signal RNET10 to a binary ONE and when signal C1X10 is a binary ONE. The binary ONE and binary ZERO terminals of flip-flop 120-50 are applied to the cycle counter circuit of FIG. 1a.

The block 120-14 also includes error checking circuits which include an AND gate and amplifier circuit 120-62, a gate and inverter circuit 120-64 and an AND gate and amplifier circuit 120-62. The AND circuit 120-60 is operative to produce a binary ONE signal upon detecting a parity error (i.e., signal UPX00 is a binary ONE) and this signal forces a HALT10 signal to a binary ONE in the absence of the decoding a set nonexecute test microinstruction (i.e., signal SNET00 is a binary ZERO). The HALT10 signal is used to stop the control store clock 120-20 of FIG. 1. The complement UPX10 of parity error signal UPX00 is used to control the operation of the increment signal generation circuits. These circuits generate an increment signal RP110 which causes the contents of the control store address register of FIG. 1 to be incremented by one, causing the next sequential storage location of the control store 120-2 to be addressed during the following cycle of operation. As seen from FIG. 1c, these circuits include an AND gate 120-72, AND gate 120-74, a gate 120-73, a gate 120-75, an amplifier circuit 120-70 and amplifier circuit 120-76 arranged as shown. The AND gate 120-72, as indicated from the flow chart of FIG. 3, forces the increment signal RP110 to a binary ONE in response to the execution of a type 6 microinstruction. The AND gate 120-74 forces the increment signal RP110 to a binary ONE when either no parity error has been detected (i.e., signal UPX10 is a binary ONE) or in response to a SNET microinstruction (i.e., signal SNET10 is a binary ONE) during a CIA cycle of operation.

The control store address/diagnostic circuits further include circuits for determining whether a nonexecute test operation had been properly initiated. These circuits include a synchronous flip-flop 120-80 with associated logic circuits arranged as shown. It is seen that the flip-flop 120-80 can be set at its binary ONE state in response to any one of a plurality of input signals which include an INITIALIZE signal, a control store generated subcommand signal SETXF10, and a load completed signal. These signals are applied via the gates 120-82, 120-84, and 120-86. When applied, each signal causes an amplifier circuit 120-88 to force a clear output signal CLR10 to a binary ONE which in turn switches flip-flop 120-80 to a binary ONE via a gate 120-87.

The flip-flop 120-80 is reset to its binary ZERO state only after it has been determined that a nonexecute test operation was initiated properly. This resetting occurs via an AND gate and inverter circuit 120-83 and AND gate 120-89. An AND gate and amplifier circuit 120-81 combines the binary ZERO output signal of the flip-flop 120-80 with the RNET10 output signal from AND gate and amplifier circuit 120-46. When the AND circuit 120-81 produces a binary ONE output signal, the signal is used to switch on error circuits, not shown, indicating that the nonexecute test has been improperly initiated. As explained herein, the error would indicate that a storage location which does not exist had been addressed. An AND gate and inverter circuit 120-83 combines the binary ONE output signal of flip-flop 120-80 with the RNET10 signal and resets the flip-flop 120-80 via an AND gate 120-89 when the test has been correctly initiated. Resetting could also be accomplished by a control store subcommand.

Figure 1D:
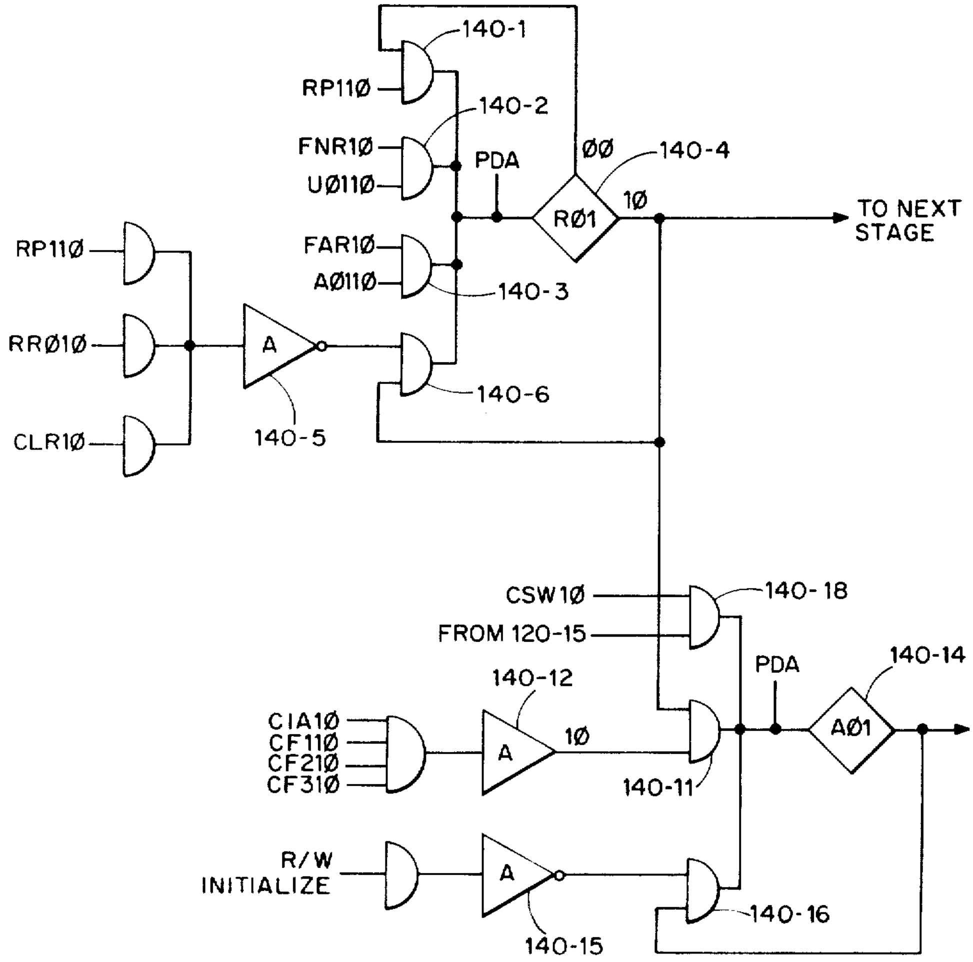
FIG. 1*d* shows in greater detail several stages of the control store auxiliary register and address register of FIG. 1.
Figure 1C:
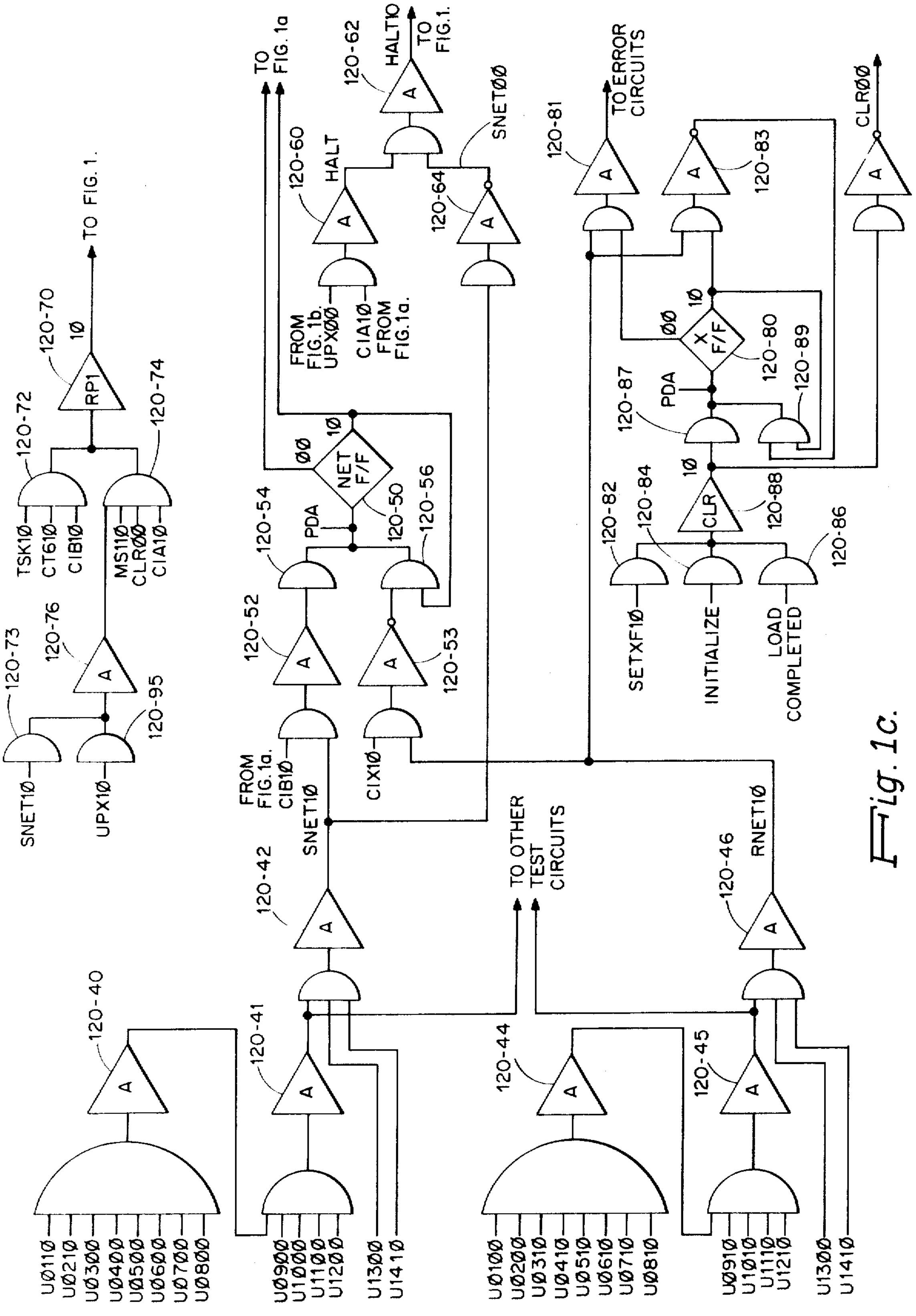
FIG. 1*c* shows the branch/diagnostic apparatus of FIG. 1.

FIG. 1d shows, in greater detail, a representative stage of both the auxiliary control store address register 120-3 and the control store address register 120-4. Specifically, the first stage of each register is shown with associated logic circuits for transferring a bit of address information from the various portions of the system of FIG. 1 into the auxiliary register 120-3 and then into the address register 120-4. Considering the two stages in greater detail, it is seen that the stage of the auxiliary control store address register includes a single synchronous flip-flop 140-4 which is operative to receive via an AND gate 140-2 a bit of information (i.e., signal UO110) from the first stage of the output register 120-8 in response to the branch subcommand signal FNR10. Also, an AND gate 140-3 provides means for switching the state of flip-flop 140-4 in response to the subcommand signal FAR10 in accordance with the state of the first stage (i.e., signal AO110) of register 106-2. An AND gate 140-1 increments by one, the flip-flop 140-4 contents in response to the increment signal RP110. Resetting of flip-flop 140-4 is accomplished via an AND gate 140-6 and an OR gate and inverter circuit 140-5. Resetting occurs in response to increment signal RP110, clear signal CLR10 and subcommand signal RR010 which is derived from combining subcommand signals FNR10 and FAR10.

As seen from FIG. 1d, the bit contents of the first stage of auxiliary register 120-3 are applied via an AND gate 140-11 and stored in the first stage of the control address register 120-4 in response to subcommand signal R2R10 generated by an AND gate and amplifier circuit 140-12. The signal R2R10 is generated in response to the signals C1A10, CF110, CF210 and CF310. Also, the bit contents of the first stage of register 120-15 are applied via an AND gate 140-18 and stored therein in response to a control store write subcommand signal CSW10. The flip-flop 140-14 is reset to its binary ZERO state via an AND gate 140-16 and a gate and inverter circuit 140-15. Resetting accurs in response to a clocking signal R/W INITIALIZE generated by the control store clock 120-20 of FIG. 1.

Description of Operation

Figure 4A:
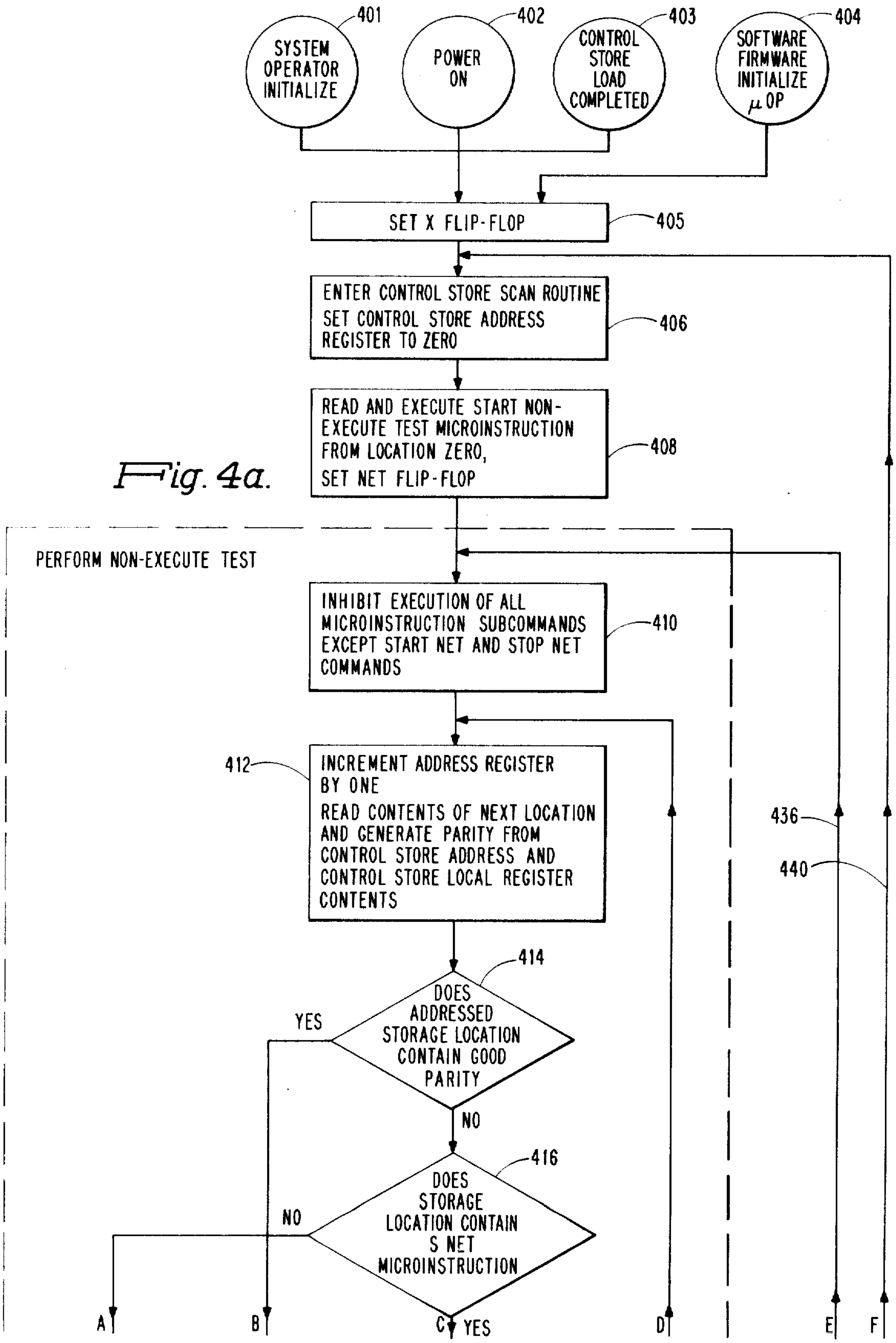

With specific reference to the flow chart of FIGS. 4*a* and 4*b* as well as the figures previously described, the operation of the system of FIG. 1 will now be given in detail. Referring first to FIG. 4*a*, it is seen that verification and testing of the control store is initiated as a consequence of any one of four events. These events include intialization of the system by a system operator, turning power onto the system, the completion of a control store load operation, and initialization by either the software or firmware which produced a control store generated subcommand signal. These events cause the automatic initiation of the nonexecute test operation as indicated in FIG. 4*a* by the lines from circles 401 through 404.

The first two conditions indicated in circles 401 and 402 are self-explanatory. The condition indicated in circle 403 occurs following the completion of an operation which involves loading the control store or a portion thereof with new information. This operation involved the pair of registers 120-15 and 120-17 of FIG. 1 which in response to a control store load signal such as FSE10 are loaded with bytes of information including addresses and microinstruction words. The address information is applied to the control address register 120-4 and bytes of microinstruction words are applied to the driver circuits 120-5 in response to signal CSW10. It will be appreciated that registers 120-15 and 120-17 may be loaded externally from a storage device or internally by the system 100 via register 106-8. Similarly, the subcommand signal CSW10 may be generated externally or internally as appropriate to the data source from which it is being loaded. Loading takes place in response to a sequence of signals similar to those used to read and restore microinstructions from the control store 120-2. However, this sequence is initiated under different conditions, such as in response to a type 1 microinstruction where the system 100 self-loads its own control store or in response to the servicing or maintenance device generation of signal FSE10. The arrangement selected depends upon the requirements of the system.

The control store control circuits of block 120-4 are conditioned to initiate read/write cycles during which information at that the addresses indicated are written therein in a conventional manner. At the completion of the loading operation, signalled by sensing a maximum address or a predetermined address within address register 120-4, the load completed signal is generated by means, not shown.

The condition indicated in circle 404 is generated by the forcing of a predetermined address into control address register 120-4 in response to a specified event. This, in turn, would cause the read out of a microinstruction word containing a bit pattern which would cause the generation of the initialize subcommand signal.

Upon the occurrence of any one of the above mentioned events, flip-flop 120-80 of FIG. 1*c* is set to its binary ONE state as indicated by block 405. From FIG. 1*c*, it is seen that any one of the input conditions force Clear signal CLR10 to a binary ONE which in turn resets the stages of the auxiliary control store register 120-3 to binary ZEROS. The complement of the clear signal, CLR00, causes the flip-flops 130-2 through 130-6 of FIG. 1a to be reset to their binary ZERO states. At the same time, the clear signal CLR10 forces flip-flop 130-1 to its binary ZERO state. Thus, the control store 120-2 has been made ready to read out the contents of storage location 0000.

In accordance with the present invention, the addressed location is arranged to store a set nonexecute test microinstruction word. This word, as mentioned, has the format of the first word shown in FIG. 2*h*. That is, bits 13 and 14 of the microinstruction word are coded as 0, 1 and the 12 bit address field is coded 0003. The switching of flip-flop 130-1 to its binary ONE state first causes a read cycle of operation to be performed. During this interval, the all zero contents of the auxiliary register 120-3 are stored in the control address register 120-4 in response to subcommand signal R2R10 and the SNET microinstruction word contained in the addressed all zero storage location is sensed by sense amplifier circuits 120-6 and stored in the register 120-8 in response to subcommand signal URH10.

At the completion of a 1.5 microsecond interval, flip-flop 130-1 is switched from its binary ONE to its binary ZERO state and flip-flop 130-2 is switched to its binary ONE state. The set nonexecute test microinstruction word contained within register 120-8 is executed during this cycle of operation which results in the performance of the operation specified by block 410. First, AND gate 120-40, AND gate 120-41, and AND gate 140-42 of FIG. 1c decode the SNET microinstruction word. These circuits force signal SNET10 to a binary ONE which in turn switches the NET flip-flop 120-50 forcing signal NET10 to a binary ONE and signal NET00 to a binary ZERO. At the completion of the C1B cycle, the flip-flop 130-2 is switched from its binary ONE to its binary ZERO state and flip-flop 130-1 is again switched to a binary ONE via AND gate 130-18.

The switching of NET flip-flop 120-50, as shown by FIG. 4*a*, commences the beginning of the Non Execute test during which the control store contents and the control store operation are verified by the diagnostic apparatus.

Figure 4B:
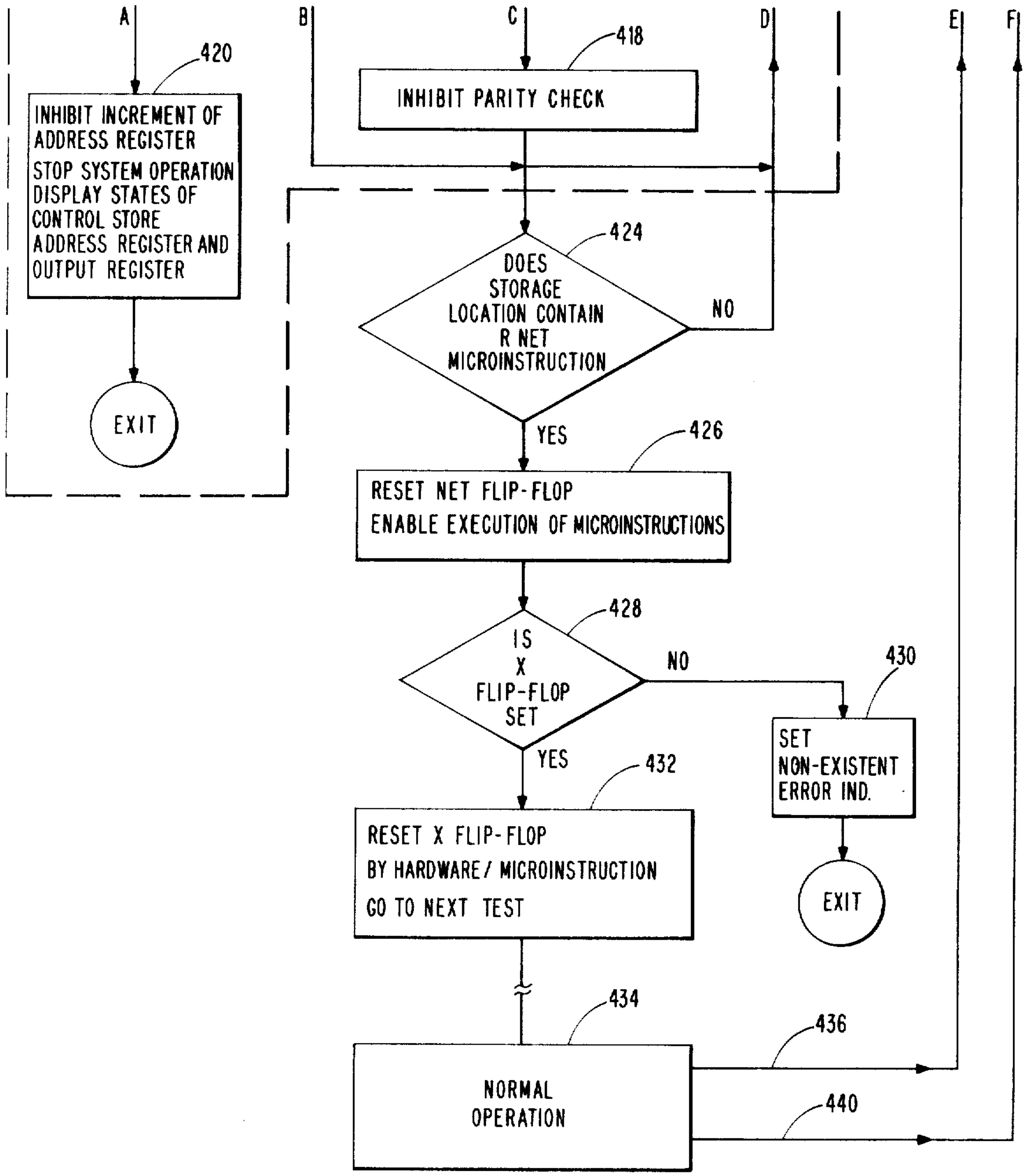

During the test, only those operations indicated by blocks 410 through 420 in FIGS. 4*a* and 4*b* are performed by the diagnostic apparatus. As seen from FIG. 4*a*, the diagnostic apparatus inhibits the execution of all microinstruction subcommands except those specified by the set nonexecute test and reset nonexecute test microinstructions. This is accomplished primarily by the NET flip-flop 120-50 of FIG. 1*c*. The state of this flip-flop, as mentioned, defines the states of control signals NET10 and NET00. At the end of each read cycle, these signals inhibit execution cycle flip-flop 130-2 from being set to a binary ONE, allowing only flip-flop 130-3 to be set to a binary ONE state. The result is that the subcommands normally executed during a C1B cycle cannot be executed during the verification and testing of control store 120-2.

Once the SNET microinstruction causes the transfer of control to the diagnostic apparatus, the only subcommands executed are those permitted by the diagnostic apparatus. As seen from FIGS. 3 and 4, these operations include the operations normally executed during a C1A cycle as for example, generating the increment signal RPI10 in addition to the decoding of the SNET and RNET microinstruction as specified in block 410. In addition to these operations, as shown by blocks 410 and 414 of FIG. 4*a*, parity is computed for the contents of the control store auxiliary register and control store output register and then checked. The checking circuits of block 120-3, shown in greater detail in FIG. 1*b*, perform the parity checking operation and generate parity error signals UPX10 and UPX00 which are applied to the AND gates 120-74 and 120-60 of FIG. 1*c*.

When either the microinstruction word read out to the register 120-8 has incorrect parity or the microinstruction word has been read from an incorrect address, the parity checking circuits force signal UPX10 to a binary ZERO and signal UPX00 to a binary ONE. As seen from FIG. 1*c*, signal UPX10 inhibits the generation of the increment signal, RP110. At the same time, signal UPX00 forces the HALT10 signal to a binary ONE. This signal is applied to the control store clock 120-20 of FIG. 1 and is operative to freeze the system in its present state. At the same time, the contents of the control store address register 120-4 and contents of the register 120-8 are displayed on appropriate system indicators along with an indication of the error condition as shown in block 420.

When the contents of an addressed storage location have been deemed correct, causing no parity error indication, the AND gate 120-74 of FIG. 1*c* generates increment signal RP110. As indicated by blocks 414, 416, 418 and 424, incrementing occurs only when the microinstruction word stored in the storage location has correct parity and is not a RNET microinstruction. It will also be noted that incrementing can also occur when the microinstruction is a SNET microinstruction. In that instance, the parity check is inhibited and the address contents are incremented by one.

As mentioned previously, when a nonexistent storage location is addressed, no information is read out to the sense amplifier circuits 120-6 of FIG. 1. The output terminals of these circuits are wired to the inputs of the stages of register 120-8 so as to apply a bit configuration corresponding to the SNET bit pattern. In this way, the present invention permits the addressing of nonexistent storage locations without stopping the test. Specifically, when a nonexistent storage location is addressed and no output signals are applied to the sense amplifier circuits 120-3, these circuits cause a bit pattern of the SNET microinstruction word to be stored in register 120-8. This causes the diagnostic apparatus to again force signal SNET10 to a binary ONE state which has no effect on the NET flip-flop since it can only be set during an execute cycle of operation (i.e., when signal C1B10 is a binary ONE). As indicated by block 418, signal SNET10 produced by the SNET microinstruction inhibits a parity error signal from stopping the test and allows generation of the increment signal.

The contents of each of the storage locations of control store 120-2 are verified until a RNET microinstruction is read out to register 120-8. It will be noted that the RNET microinstruction word contains as an address field, the bit pattern octal 7774. This bit pattern is coded to be the complement of the bit pattern for the SNET microinstruction. The use of complementary patterns facilitates testing of the storage devices and paths of the branching circuits of block 120-14.

As seen from FIG. 4*b*, the decoding of the RNET microinstruction word is followed by the performance of the operations indicated in block 426. In greater detail, the decoding of the RNET microinstruction word is performed by AND gates 120-44 through 120-46 of FIG. 1*c*. These gates cause signal RNET10 to be forced to a binary ONE state switching NET flip-flop 120-50 from its binary ONE to its binary ZERO state. The change in state of flip-flop 120-50 results in forcing signal NET10 to a binary ZERO and the signal NET00 to a binary ONE.

With the above change in state, the system of FIG. 1 is now enabled to execute subsequently read microinstructions. Specifically, the signal NET00 enables execute cycle flip-flop 130-2 to be switched to its binary ONE state following a C1A cycle. At the same time, the signal NET10 inhibits flip-flop 130-3 from being switched to its binary ONE state.

Following the performance of operations indicated within block 426 of FIG. 4*b*, the circuits of FIG. 1*c* are now operative to determine whether or not the nonexecute test had been initiated properly. Specifically, the AND gate and amplifier circuit 120-81 of FIG. 1*c*, samples the state of the valid test store flip-flop 120-80. If flip-flop 120-80 is set to its binary ONE state, either the AND gate and inverter circuit 120-83 or other means, not shown, is operative to reset it to its binary ZERO state as indicated by block 432. The system then either exits to another test or performs normal processing operations.

When flip-flop 120-80 has not been switched to its binary ONE state, AND gate and amplifier circuit 120-81 produces an error signal which sets an error indicator as illustrated by block 430. The error signal corresponds to the situation represented by line 436 wherein during normal operation, a nonexistent memory location was addressed which in turn initiated a nonexecute test operation by setting the NET flip-flop 120-50 during a C1B cycle. Because the test was improperly initiated, the flip-flop 120-80 remains in the binary ZERO state and the error is signalled.

From the above, it is seen that it is possible to skip portions of the control store by inserting the SNET microinstruction words in those locations. Further, the control store is arranged to have nonexistent memory locations appear that they contain SNET microinstruction words.

As seen from FIG. 4*b*, there is another entry point (i.e., line 440) for initiating the subject test operation. This point represents an optional reentry to this diagnostic test via an initialize subcommand. For example, when maintenance personnel press a pushbutton during normal operation, this causes the control store 120-2 to address a predetermined storage location which causes the generation of subcommand signal which switches flip-flop 120-80 to its binary ONE state.

From the foregoing description, it has been seen that the present invention provides diagnostic apparatus for reliably testing and verifying the contents of a microprogrammed control store and the operation of its associated apparatus. More importantly, the invention provides the testing procedure which can only be initiated under microinstruction control facilitated by storing resident diagnostic routines within the control apparatus. Further, the invention provides for the automatic of sequencing through noncontiguous areas of the control store during the test and verification operation. Also, the invention provides for determining whether or not the test and verification operation has been properly initiated and signals an error indication when the operation has not been properly initiated.

By having independent diagnostic apparatus in response to predetermined microinstruction words transfer control for initiating and completing the test operation, the invention ensures that these operations are correctly initiated and completed successfully.

It will be obvious to those skilled in the art that many modifications can be made to the present invention. For example, alternate ways which may involve eliminating the additional cycle flip-flop can be provided for inhibiting the execution of subcommands. However, it is believed that these ways may render it more difficult for maintenance personnel to diagnose faults within the system.

It will also be appreciated that other ways can be employed to determine when the test operation has been completed. For example, additional apparatus which detects when the contents of the control store address register have been incremented to a predetermined address may be used to determine the completion of the test operation.

Also, it will be appreciated that while a writable control store was disclosed the invention can also be used with a read only memory control store as well as a combination of the two control stores.

While in accordance with the provisions and statutes, there has been described and illustrated the best form of the invention known, certain changes may be made to the elements described without departing from the spirit of the invention as set forth in the appended claim and that in some cases, certain features of the invention may be used to advantage without the corresponding use of other features.

Having described the invention, what is claimed as new and novel and for which it is desired to secure Letters Patent is:

1. A microprogrammed processing unit comprising:

a cycled addressable control store including a plurality of storage locations for storing a corresponding number of microinstruction words, said control store further including first register means coupled to said store for storing addresses for referencing said plurality of storage locations and second register means coupled to said store for storing the microinstruction word contents of a referenced storage location during an operative cycle of said control store;

decoding means coupled to said second register means; said decoding means being operative to generate a plurality of control signals in response to each microinstruction word stored in said second register;

cycle control means coupled to said decoding means, said cycle control means being operative during a cycle of operation to generate cycle control signals designating a read cycle and an execution cycle of each operative cycle;

means coupled to said cycle control means and to said decoding means, said means being operative to combine said microoperation control signals and said cycle control signals to produce subcommand signals for directing said processing unit in executing operations during said read and execute cycles specified by the coding of said microinstruction words;

address control means coupled to said second register means and to said cycle control means, said address control means including; input means coupled to said first register means, means for sensing the presence of predetermined bit patterns contained within the microinstruction words stored in said second register means, and inhibit control means coupled to said sensing means; and said input means forcing said first register means to reference a predetermined storage location in response to an input control signal for read out of a first one of said predetermined bit patterns into said second register means, said means for sensing being operative to generate a first subcommand signal switching said inhibit control means to a first state during an execution cycle, said inhibit control means when in said first state being operative to inhibit said cycle control means from generating signals defining said execution cycles of successive operative cycles thereby allowing testing of said microinstruction words read out to said second register during said successive operative cycles.

2. The apparatus of claim 1 wherein said means for sensing includes means responsive to a second predetermined bit pattern to generate a second subcommand signal switching said control means from said first state to said second state, said inhibit control means when in said second state being operative to enable said cycle control means to generate again said signals defining both said read and execute cycles of successive operative cycles.

3. The apparatus of claim 1 wherein said control store is a writable control store.

4. The apparatus of claim 1 wherein said predetermined storage location is one in a series of storage locations coded for storing microinstruction words of a diagnostic microprogram.

5. The apparatus of claim 1 wherein said address control further includes gating means for receiving a plurality of input signals, said gating means being operative in response to any one of said input signals to force said first register means to reference said predetermined storage location.

6. The apparatus of claim 2 wherein said first and second bit patterns are coded to be complementary to each other.

7. The apparatus of claim 1 wherein said unit further includes checking means coupled to said first and second register means for performing a checking operation based on the contents of both of said register means, said checking means being coupled to said address control means and operative during each of said successive operative cycles to generate a signal upon the occurrence of an error in the results of said checking operation, said address control means being operative in response to said signal to inhibit further cycling of said control store.

8. The apparatus of claim 7 wherein said checking means includes parity generation circuit means and comparison circuit means coupled to said parity generation circuit means, said parity generation circuit means being operative to generate a parity signal by summing both the microinstruction word and address stored in said first and second register means respectively, said comparison circuit means being operative to compare said parity signal with a parity bit in said microinstruction word and generate said signal upon the absence of a true comparison.

9. The apparatus of claim 7 wherein said address control means includes increment control means coupled to said first register means, said increment control means being operative to generate an increment signal for modifying the contents of said first register means to reference a next sequential storage location during a next operative cycle, said increment control means being conditioned by said signal from said checking means to inhibit the generation of said increment signal.

10. The apparatus of claim 2 wherein said address control means includes storage means coupled to said input means and gating means coupled to said storage means and to said means for sensing, said storage means being conditioned by input means to switch from a first state to a second state in response to said input control signal and said storage means when in said first state conditioning said gating means to generate an output signal when enabled by said second subcommand signal indicating that said testing had been improperly initiated.

11. The apparatus of claim 9 wherein said control store includes means for causing a microinstruction word coded to produce said first subcommand signal to be stored in said second register when said first register conditions said control store to reference a nonexistent storage location and wherein said means for sensing couples to said increment control means and to said checking means, said increment control means in response to said first subcommand signal being operative to generate said increment signal in the presence of said signal and said checking means being conditioned by said first subcommand signal to allow said further cycling of said control store.

12. A microprogrammed processing system having registers for storing data and status information which includes:

a cycled addressable control store for directing the operation of said system, said store including a plurality of storage locations arranged to store a corresponding number of microinstruction words including microinstruction words coded to specify a first type of operation, first register means for storing addresses for accessing said store, second register means for storing a microinstruction word read out from an accessed location during an operative cycle;

decoder means coupled to said second register means, said decoding means being operative to generate a plurality of subcommand signals in response to each microinstruction word being read out to said second register means for executing elementary operations specified by said each microinstruction word for modifying said data and status information contained in said registers; and, cycle control means coupled to said control store, said cycle control means being operative to generate cycle control signals for defining operations to be performed by said system during each operative cycle;

diagnostic apparatus for testing and verifying the operation of said control store, said diagnostic apparatus including:

logic means coupled to said second register means for receiving coded signals representative of a microinstruction word specifying said first type of operation, said microinstruction word read out from a predetermined storage location to said second register means during a first cycle of an operative cycle defined by said cycle control signals, said logic means being operative in response to receiving a first predetermined set of coded signals included within said microinstruction word to generate a first test subcommand signal specifying a test operation in place of said first type of operation, and test control means coupled to said logic means and to said cycle control means, said test control means being operative in response to said first test subcommand signal to condition said cycle control means to generate signals for defining only those operations required for verifying the correctness of microinstruction words of said storage locations accessed during succeeding operative cycles without alteration of said data and status information.

13. The system of claim 12 wherein said logic means is responsive to a second predetermined set of coded signals included within a microinstruction word specifying said first type of operation to generate a second test subcommand signal, said test control means being operative in response to said second control signal to condition said cycle control means to generate signals for again defining said operations.

14. The system of claim 12 wherein said control store is a writable control store.

15. The system of claim 12 wherein said predetermined storage location is one included in a series of storage locations containing microinstruction words of a diagnostic microprogram resident in said control store.

16. The system of claim 13 wherein said first and second predetermined sets of coded signals are complementary to each other.

17. The system of claim 12 wherein said system further includes:

checking means coupled to said first and second register means for performing a checking operation upon the contents of both register means, said checking means being coupled to said logic means and including means for generating an error signal upon detecting an error condition upon performing said checking operation and wherein said means for generating includes control means coupled to said control store, said control means being operative in response to said error signal to inhibit further cycling of said control store.

18. The system of claim 17 wherein said checking means includes parity generation circuit means and comparing circuit means coupled to said parity generation circuit means, said parity generation circuit means being operative to generate a parity signal by summing both the microinstruction word and address stored in said first and second register means respectively, said comparison circuit means being operative to compare said parity signal with a parity bit in said microinstruction word and generate said signal upon the absence of a true comparison.

19. Microdiagnostic apparatus for enabling the verification of the operation of a control section of a data processing system including a plurality of registers for storing processing information; a cycled control store having a plurality of storage locations arranged to store microinstruction words of a plurality of microprogram routines; said store including cycle control means for generating signals defining read and execution cycles of operative cycles of said store and decoding circuits coupled to said control store and being operative in response to each microinstruction word referenced during each occurrence of a signal defining a read cycle to generate subcommand signals for directing the transfer of processing information between said plurality of said registers of said system in executing operations specified by the coding of said each microinstruction word during each occurrence of a signal defining an execution cycle, said microdiagnostic apparatus comprising:

input means coupled to said control store, said input means being operative in response to an input signal to condition said control store to read out a microinstruction word specifying one type of operation from a predetermined one of said plurality of storage locations; and, control means coupled to said control store, said control means including logic means coupled to said decoding means and to said cycle control means, said logic means being responsive to a predetermined bit pattern within said microinstruction word to inhibit said decoding circuits from generating said subcommand signals for the execution of said one type of operation during the occurrence of said signal defining said execution cycle, and checking means coupled to receive signals representative of said microinstruction word contents for performing a checking operation thereon, said logic means including means to enable the verification of the microinstruction word contents of said control store storage locations referenced during succeeding operative cycles by said checking means without alteration of said processing information.

20. The apparatus of claim 19 wherein said microinstruction word specifying said one type of operation includes an address field portion coded to contain said predetermined bit pattern and an operation code portion coded to specify a branch operation as said one type of operation.

* * * * *

UNITED STATES PATENT OFFICE
CERTIFICATE OF CORRECTION

Patent No. 3,831,148 Dated August 20, 1974

Inventor(s) Donald J. Greenwald and Thomas O. Holtey

It is certified that error appears in the above-identified patent and that said Letters Patent are hereby corrected as shown below:

Column 20, line 20, before "control" insert --inhibit--.

Signed and sealed this 24th day of December 1974.

(SEAL)
Attest:

McCOY M. GIBSON JR.
Attesting Officer

C. MARSHALL DANN
Commissioner of Patents